3,298,871
ELECTRIC CELLS WITH SPIRAL WOUND ELECTRODES
Pierre Binder, Paris, and Yves Jacques Felix Lecouffe, Vincennes, France, assignors to Societe des Accumulateurs Fixes et de Traction, Romainville, Seine, France, a French company
Filed July 31, 1964, Ser. No. 386,642
Claims priority, application France, Aug. 2, 1963, 943,666; June 19, 1964, 979,019
8 Claims. (Cl. 136—175)

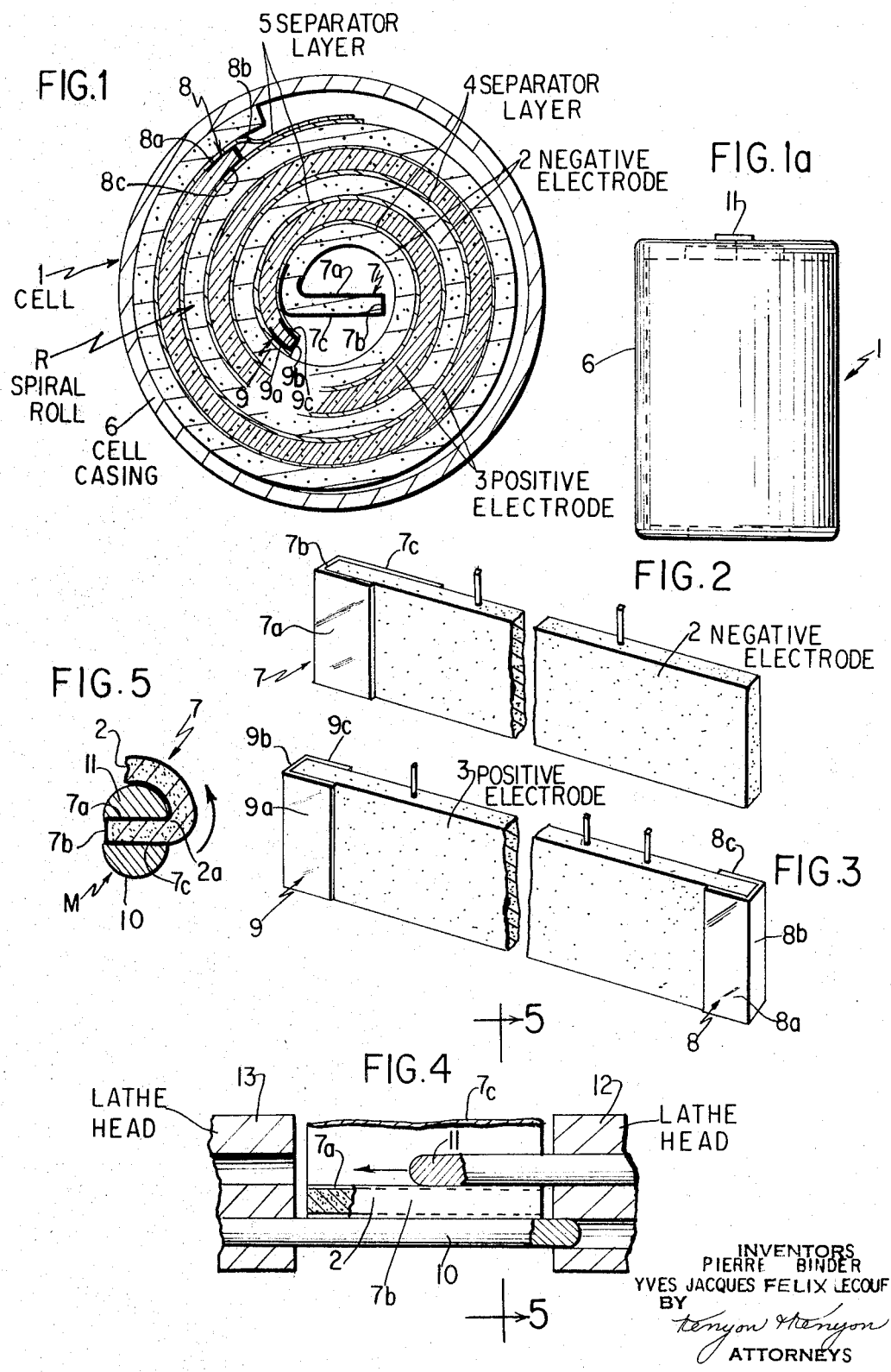

The present invention relates to electric cells such as primary or secondary cells or other electrolytic cells or condensers containing spirally wound electrodes and to novel processes for their manufacture.

Principal objects and features of the invention are an improved process for manufacturing electric cells utilizing spirally wound electrodes.

Primary or secondary cells in which two electrodes of opposite polarity, each being of band form that are spirally wound together with either two separator bands interposed between the electrodes or only one separator band folded around one of the electrodes, are already known in the art. Such primary or secondary cells yield excellent performance characteristics, but their manufacture, the principle of which, i.e. the simultaneous winding of the electrodes and separators, is very simple, gives rise to several problems in its practical application. The electrodes used, e.g. in alkaline storage cells of the nickel-cadmium type, very often consist of thin sintered electrodes. Such electrodes usually comprise sintered layers situated on both sides of a carrier made, for instance, of a perforated metal foil.

In order to wind the electrodes of opposite polarity and their interposed separator or separators together into a spiral roll, usually the end of one of the electrode bands, e.g. the negative electrode band, is inserted into a slot extending for the whole length of a mandrel which is mounted between the heads of a winding lathe. Then, the winding lathe is operated manually or automatically so that the mandrel is rotated for about one turn in order to maintain the end of said electrode band in its inserted position in said slot. Then, the second electrode, e.g. the positive band, may be placed over the mandrel-mounted negative electrode band. In this example, the positive electrode band is covered by or coated with one or two separator bands as afore-mentioned. If only one separator band is provided on the positive electrode band, said separator band is folded around the positive electrode band so that said separator band lies interposed between the positive and negative electrode bands. The winding lathe is then operated to completely wind up the two electrode bands and interposed separator into a spiral roll.

When the spiral winding of the electrode bands and separator band or bands is completed, the special roll thus formed may be placed in the cell casing and assembly of the cell completed in conventional manner.

In practice, however, several problems or drawbacks arise in the practice of this conventional process.

For example, the respective electrode bands are generally severed to required lengths by machine or hand from long, continuous lengths of such bands. One particularly vexatious problem or drawback that arises as a result is that sharp, rough edges or burrs exist at the ends of the required severed lengths of such positive and negative electrode bands. Thus, when these severed lengths of electrode bands are spirally wound up together with the interposed separator or separators between them to form the required spiral cell roll, there is a great risk that the separator or separators could be pierced at the sites of such rough edges or burrs in the spirally wound cell roll. This would result in short-circuiting between the positive and negative electrodes at one or more of such sites.

A further problem or drawback arises from the fact that the electrode band whose end has been inserted into the slot of the said mandrel has a substantially right angle fold at the point of its emergence from said slot. Thus, there is a great risk that sintered layers of this electrode band will crack at this fold, and loosen or chip off from the metal foil of such band or else, form burrs or the like with sharp edges which could pierce the separator or separators at the said fold or wherever else such loosening, chipping off or formation of burrs or the like occurs. Again, this would result in short-circuiting.

A further problem or drawback which arises in the manufacturing process for cells with wound electrode bands is that it may happen that the sintered layer or layers on electrode bands which are to be used therefore, will at some local places thereon be likely to crack and loosen or chip off. This may be due to a defect in the sintering process or the manufacture of the long, continuous lengths of such electrode band, or to an accident during the handling of continuous lengths thereof or of the particularly required severed lengths of these bands. If the severed lengths of such bands were to be used for manufacturing cells with wound electrodes, there would be a great risk of increasing the cracking, loosening or chipping of the sintered layer or layers during the winding process. A mere weakening in the adherence of the sintered layer or layers at any local places would when such bands are subjected to the tensions caused by bending thereof during the winding up thereof provide a great risk causing a complete chipping off of the cracked or loosened sintered mass at said local places in such severed lengths. These chips or merely loosened portions would then almost certainly result in cell failure by short-circuiting between electrodes in the cells if they were used. Heretofore, in order to prevent such failure of the cells, any electrode band having the least defect at any local place of this kind were systematically rejected. Such rejection, of course, results in a high waste in the manufacture of cells with spirally wound electrodes. This waste heavily increases the cost of the electric cells of the type in question. As a result, the prices of such cells is unnecessarily high.

Further principal features and objects of the present invention are to eliminate all of these drawbacks.

In the practice of the process of this invention, to eliminate these various drawbacks, an especially notable feature is the provision of a protective sheet at least at one or at both ends of one or several electrodes that are to be wound up to form the spiral cell roll prior to their winding. It may be seen that such a protective sheet or sheets will serve to suppress sharp or rough end edges of the severed lengths of the electrodes and also avoid the cracking of the sintered layer or layers at the center of the spirally wound roll, thus providing a simple and effective solution to the prior problems of drawbacks.

According to a further feature or characteristic of the invention, the said protective sheet is made of a soft and adhesive material.

According to another feature or characteristic of the invention, the said protective sheet is folded around an end or ends of the said severed lengths of electrode or electrodes.

According to still another feature or characteristic of the invention, the said sheet when so folded extends on each side of the said severed lengths of electrode or electrodes to an equal extent or to unequal extents.

In the practice of the process of this invention in the elimination of various of the drawbacks, a further specially notable feature is that the cracked or loosened places of the sintered layer or layers of defective electrode bands are covered with a protective sheet made of a soft and adhesive material.

According to the other characteristics or features of the invention, the latter protective sheet is just large enough to cover the said defective, cracked or loosened part of the defective electrode or electrodes. In this way, the sintered mass in the defective area or areas is maintained and there are no longer any risks of loosening of such mass or masses in said areas to cause short-circuiting in the cell. It is thus possible to use electrodes having a few defects of the kind mentioned, whereas such electrodes heretofore had to be rejected for the reasons hereabove mentioned. The electrode area or areas screened by the latter protective sheet from the electro-chemical exchanges being very small as compared to the total area of the electrode, such application thereof to the locally defective areas does not substantially affect the performance of a primary or secondary cell with spirally wound electrodes utilizing such defective electrode or electrodes thus manufactured.

Moreover, the said protective sheet may be made of a material pervious to the ions taking part in the electrochemical reactions such as regenerated cellulose, so that the electrochemical exchanges are in no way hampered.

According to another feature or characteristic of the invention, when the winding operation is made by using a mandrel with a slot in which the electrode, e.g. the longest electrode, is inserted, the protective sheet is such that it extends on a length of the said electrode to an extent which is longer than the length of the insertion into the slot of the said mandrel.

According to still another feature or characteristic of the invention, and according to an embodiment, the said protective sheet which is placed at the end of the electrode band and inserted into the slot of the mandrel, extends on the said band to an extent which has a length equal to the depth of the slot plus about half a turn or one turn of the winding around the mandrel at least on the side of the said band facing the outer part of the roll.

Other objects and features of the invention are the provision of the primary or secondary or electrolytic cells resulting from the processes herein described.

Further objects and features of this invention will become apparent from the following specification and accompanying drawings, herein.

In the accompanying drawings given only as an example without limitation:

FIG. 1 is a sectional view of a primary, secondary or electrolytic cell according to the invention;

FIG. 1a is an elevational view of a cell embodying the invention;

FIGS. 2 and 3 are perspective views of two bands of electrodes of opposite polarities according to the invention;

FIG. 4 shows a type of mandrel which may be used for the manufacture of primary, secondary, or electrolytic cells with wound electrodes, and FIG. 5 is a sectional view along line 5—5 of FIG. 4.

According to the embodiment shown in FIGS. 1 and 1a, a primary, secondary or electrolytic cell 1 of the kind having wound electrode bands, comprises an electrode 2 (e.g. negative electrode) having a greater length, a shorter electrode 3 (e.g. positive) and two separator layers 4 and 5 which may be constituted as shown in FIG. 1 by a single separator band folded around the shortest electrode 3 (positive in the example). The metallic casing 6 of the cell is shown surrounding the roll of electrodes.

In the example, the protective sheet 7 is shown positioned on the longest (e.g. negative) electrode 2 on and around the end of the said electrode which is to be inserted into the mandrel for making the spiral roll R. As may be seen in this figure, the protective sheet 7 covers a length 7a of the said electrode 2 which is slightly greater than the diameter of the mandrel on the side of the said electrode facing the inner part of the roll R. The said sheet also covers the cut edge 7b of the said electrode. Lastly, it also covers a part 7c of the other side of the said electrode facing the outer part of the roll and is at least partly in contact with the separator band 4. Said part 7c extends for a length equal at least to half a turn and up to one turn of the roll around the mandrel.

Another protective sheet may be provided on the end of the shortest (e.g. positive) electrode band 3, folded across it at 8 and covering, as may be seen, the cut edge 8b of the said electrode 3. It may also stretch on narrow border parts 8a and 8c on each of the sides of said electrode.

Such disposition is adopted when the negative electrode 2 overlaps the positive electrode 3 at the outer part of the roll R. If the positive electrode 3 overlaps the negative electrode 2, which may be the case even with a shorter positive electrode 3, protective sheet 8 is located instead on the outer end of the negative electrode 2.

A protective sheet 9 similar to the protective sheet 8 has also been shown folded around the other end of the positive electrode 3, this being the end placed near the center of the roll R, sheet 9 covering the cut edge 9b of the said electrode 3 and extending on two narrow border parts 9a and 9c on both sides on the electrode band 3.

The perspective views in FIGS. 2 and 3 clearly show the way of placing such protective sheets, said views representing the electrode bands 2 and 3 used for making the roll R of FIG. 1.

As a matter of fact, the part played by the protective sheets thus placed is not the same in all places. The purpose of protective sheets 8 and 9 is to remedy the drawbacks due to the possible and frequent presence of sharp edges at the ends of the selected lengths of electrode bands (which are usually cut by a machine). In this way, there is no risk of piercing or cutting the separator bands 4 and 5 in these places by the electrode band thus covered. Without the protective sheets this has happened at that end 8 of electrode 3 most frequently as it is on the outer part of the roll R that the force tending to unwind the roll, and thus pierce or cut the separator, is greatest.

It is obvious that the role played by protective sheet 9 is similar to that of protective sheet 8.

The protective sheet 7 which is located at the center of the roll R on the electrode used for beginning and guiding the winding around the mandrel plays a rather different role. This protective sheet avoids and prevents the sintered metal from cracking and loosening from the electrode where it emerges from the slot of the mandrel, i.e. at the site 2a where it is folded at approximately a right angle. On the other hand, protective sheet 7 also prevents the formation of and chipping off of loosened, sintered parts thereby eliminating the risk of piercing the separator.

Another important purpose of such protective sheet 7 is to facilitate insertion of the electrode into the mandrel.

FIGS. 4 and 5 diagrammatically show as an example, a manner of inserting the electrode into the mandrel. Electrode 2 is seen in these figures as pressed between both half cylinders 10 and 11 of the mandrel M. Obviously, when the roll R is completed, these half cylinders 10 and 11 must be removed. Usually, the winding mandrel M is constituted by two half cylindrical rods 10 and 11 which are slidable parallelly to the winding axis of the lathe-heads 12 and 13 of a winding lathe (not shown). In the example shown in FIG. 4, the half cylinder 10 of mandrel M is shown attached to the head 13 and already inserted in head 12, whereas the half cylinder 11 of mandrel M attached to head 12 extends only half-way between the heads 12 and 13 and is ready to be inserted in head 13. The protective sheet 7, which is soft and smooth, permits the half cylinders 10 and 11 to slide easily upon the negative electrode 2.

This has the advantage of facilitating the insertion of the end of electrode 2 into the winding mandrel M and of preventing metal pieces from being torn off during such insertion. Similarly, the sliding off of roll R from the slot between the half cylinders 10 and 11 when the roll R is completed is facilitated by this protective sheet 7.

It is thus possible, due to this protective sheet 7, to use mandrels M of a smaller diameter for a given thickness of electrode, since the tearing and cracking of the sintered material at the place 2a where it is folded at substantially a right angle is no more to be feared.

In a similar way, the sintered layer or layers being thus strengthened it is possible to wind thicker electrodes than used on a mandrel of a given diameter.

Moreover, a substantial gain of time is realized since the electrode can be inserted in the slot of the mandrel M much more easily than when it is not provided with a protective sheet 7.

Lastly, the speed of winding of roll R can be effected at a higher rate than ordinarily since there is no longer any risk that the sintered layer or layers or separators will respectively be ruptured or pierced at the start of the winding operation. The total gain of time may thus be as must as about 30% over times ordinarily used.

In an advantageous way, the said protective sheet material may be constituted by adhesive tape or similar materials. Commercial products known under the trade names of "Scotch" or "Rubafix" tape, etc., give good results. The protective sheets or any of them may be made of regenerated cellulose or other material pervious to ions taking part in the electrochemical reactions, so that the electrochemical exchanges are not hampered in any way.

While specific embodiments of the invention have been disclosed, variations within the scope of the appended claims are possible and contemplated. There is no intention of limitation to the exact disclosure herein made.

What is claimed is:

1. A process of manufacturing electric cells of the type utilizing thin sintered electrodes wound into spiral form with an interposed separator between adjacent electrodes to prevent damage to the separator and short circuits between electrodes by loosened and piercing particles of the sintered material of the electrodes located at ends and at deformations in the electrodes, comprising the steps of providing a winding mandrel, applying a protective adhesive covering sheet around an end of one of the electrodes so that it extends along at least one face of the latter for a limited part of its length adjacent said last-named end, inserting said last-named end into said winding mandrel so that the protective adhesive covering sheet extends outwardly of the mandrel and overlies a portion of said last-named electrode that becomes deformed in the region adjacent said mandrel when said last-named electrode is wound up on said mandrel and tends to prevent cracking off of particles of the sintered material at said region which is likely to cause damage to the separator, then partially winding up the last-named electrode on the mandrel, then applying a separator and a second electrode to said first-named electrode and completing the winding up of the electrodes and separator into spiral form on said mandrel, and thereafter removing them therefrom, the separator then being protected from damage by said particles by said protective covering sheet in said region.

2. A process of manufacturing electric cells of the type utilizing thin sintered electrodes wound into spiral form with an interposed separator between adjacent electrodes to prevent damage to the separator and short circuits by irregular particles of the sintered material of the electrodes located at ends and at deformations in the electrodes comprising the steps of providing a winding mandrel, applying a protective adhesive covering sheet of regenerated cellulosic material around an end of one of the electrodes, so that it extends along both faces of the latter for a limited part of its length adjacent said last-named end, inserting said last-named end into said winding mandrel so that the protective adhesive covering sheet extends outwardly of said mandrel and overlies portions of said last-named electrode that become deformed in the region adjacent said mandrel when said last-named electrode is wound up on said mandrel and tends to prevent cracking off of the sintered material at said region into particles which are likely to cause damage to the separator, then partially winding up the last-named electrode on the mandrel, then applying a separator and a second electrode to said first-named electrode with the separator in contact with a portion of the protective adhesive covering sheet and completing the winding up of the electrodes and separator into spiral form.

3. A process of manufacturing electric cells of the type utilizing thin sintered electrodes wound into spiral form with an interposed separator between adjacent electrodes, and wherein one of the electrodes is longer than the other, comprising the steps of providing a mandrel having a slot, applying a protective adhesive covering sheet of regenerated cellulosic material around an end of the longer one of said electrodes so that it extends along both faces of the latter for a part of its length, inserting the adhesive sheet bearing end of said longer one of said electrodes into said slot, so that the protective adhesive covering sheet extends outwardly of the slot and overlies surface portions of the said longer electrode in the region thereof that becomes bent when said last-named electrode is wound up on said mandrel and precludes cracking off of the sintered material of said longer electrode at said region, rotating said mandrel to partially wind up said longer electrode, applying a separator over the partially wound up longer electrode in contact with said adhesive covering sheet in said region, then applying the other electrode over said separator and continuing to wind up said two electrodes with interposed separator into completed spiral form, and thereafter removing the completed spiral form from said mandrel, said protective adhesive covering sheet also facilitating removal of said form from said mandrel.

4. The process of claim 3 including the additional steps of applying similar protective adhesive covering sheets to other limited portions of the thin sintered electrodes where cracking off of sintered material therefrom is likely to occur during preparation of the electrodes and their winding up into spiral form that could damage and pierce the interposed separator and short circuit the electrodes.

5. An electric cell comprising a casing, first and second thin sintered electrodes wound into spiral form, a separator between said electrodes, said first electrode being bent adjacent one end thereof forming an end portion adapted to be inserted into a mandrel for spiral winding of said electrodes, and an adhesive sheet covering both faces of said end portion of said first electrode and extending beyond the bend therein, said adhesive sheet preventing loosened particles of said sintered electrode material from damaging the separator.

6. An electric cell according to claim 5 in which each electrode has an inner end adjacent the axis of the cell and an outer end adjacent the casing, said first electrode being bent adjacent its inner end.

7. An electric cell according to claim 6 including an adhesive sheet covering the inner end of said second electrode and the portions of the side walls of said electrode adjacent said inner end.

8. An electric cell according to claim 6 in which the outer ends of said electrodes extend unequal distances, the electrode of lesser extent having an adhesive sheet covering the outer end and the portions of the sides adjacent said outer end.

References Cited by the Examiner
UNITED STATES PATENTS

| 1,269,778 | 6/1918 | Becker | 136—13.2 |
| 2,361,533 | 10/1944 | Endress et al. | 136—13.2 |
| 3,119,722 | 1/1964 | Tietze et al. | 136—6 |

FOREIGN PATENTS

| 151,437 | 9/1955 | Sweden. |

WINSTON A. DOUGLAS, *Primary Examiner.*

D. L. WALTON, *Assistant Examiner.*